United States Patent [19]

Masclet

[11] 4,051,930
[45] Oct. 4, 1977

[54] DISC BRAKE WITH GRAPHITE FRICTION LININGS

[75] Inventor: Jean Masclet, Paris, France

[73] Assignee: Messier-Hispano, Montrouge, France

[21] Appl. No.: 720,836

[22] Filed: Sept. 7, 1976

[30] Foreign Application Priority Data

Sept. 12, 1975 France .................... 75.28090

[51] Int. Cl.² ............................................. F16D 69/02
[52] U.S. Cl. ................................................. 188/251 A
[58] Field of Search ............... 188/71.1, 71.5, 73.2, 188/251 A, 251 M, 255; 192/107 R, 107 M

[56] References Cited

U.S. PATENT DOCUMENTS

| | | | |
|---|---|---|---|
| 3,724,613 | 4/1973 | Bermingham | 188/251 M X |
| 3,895,693 | 7/1975 | Lucien et al. | 188/251 A X |
| 3,932,568 | 1/1976 | Watts et al. | 188/251 A X |
| 3,936,552 | 2/1976 | Krupp et al. | 188/251 A X |

Primary Examiner—Duane A. Reger
Attorney, Agent, or Firm—Haseltine, Lake & Waters

[57] ABSTRACT

A disc brake comprising a rotor and a stator wherein the rotor and/or the stator includes a mounting member provided with a friction lining formed at least in part by a plurality of graphite plates, each plate having two flat side faces and a peripheral surface which is perpendicular to the two flat side faces, each plate being received in a recess in a side face of the mounting member, each recess having a flat bottom surface and being of a depth less than the thickness of the plate, the side wall of the recess being parallel to the peripheral surface of the plate and spaced from the peripheral surface of the plate by a distance greater than that necessary to permit thermal expansion and contraction between the mounting member and the plate. The graphite plates of one of the rotor and the stator are formed of polycrystalline graphite and the other of the rotor and the stator is formed and/or has graphite plates formed of structural graphite.

8 Claims, 3 Drawing Figures

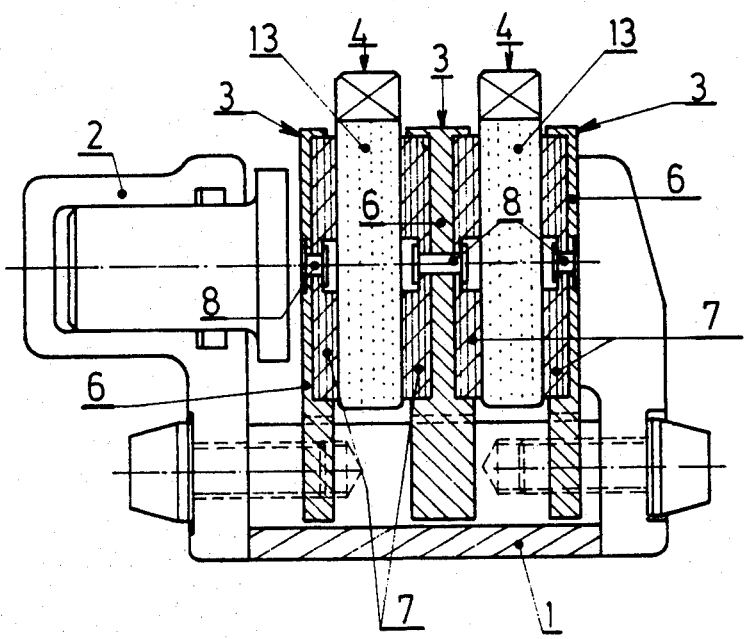
FIG_1

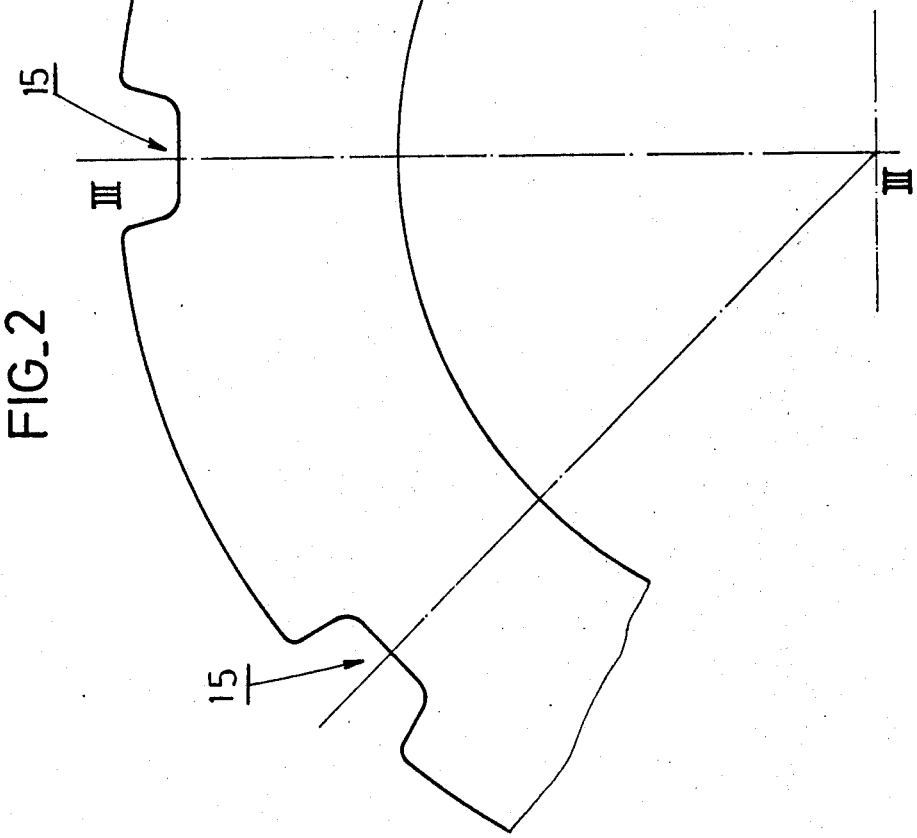

DISC BRAKE WITH GRAPHITE FRICTION LININGS

FIELD OF THE INVENTION

The present invention relates to disc brakes of the kind disclosed in U.S. Pat. No. 3,895,693 and particularly to the friction linings of such disc brakes. Such friction linings, some on rotating members and others on stationary members, produce by frictional engagement with each other a braking force and convert the major part of the kinetic energy of the vehicle being braked into heat, the assembly of the rotary and stationary members also acting as a heat sink.

BACKGROUND

In the aeronautical industry, in which disc brakes are widely used and are required to meet increasing levels of performance, technical research and development has mainly been directed to obtaining lighter weight, and higher admissible temperatures. Thus it has already been proposed that use be made of discs (rotating and/or stationary) of carbon, for example graphite, by virtue of the intrinsic advantages of such materials from the twin points of view of weight and remarkable admissible temperature. However, a major difficulty involved in the use of graphite is that the mechanical characteristics of this material are poor.

As regards anchoring the discs in rotation, it has already been proposed that either the graphite disc be adhered to a metal disc, or that the graphite disc be provided with metal rings acting as a band defining a scalloped configuration. However, these assemblies tend to be heavy, fragile and troublesome.

In the construction of U.S. Pat. No. 3,895,693, a rotor or stator for a disc brake comprises a mounting member provided with a friction lining formed at least in part by a plurality of graphite plates, each plate having two flat side faces and a peripheral surface which is perpendicular to the two flat faces, each plate being received in a recess in a side face of the mounting member, each recess having a flat bottom surface and being of a depth less than the thickness of the plate, the side wall of the recess being parallel to the peripheral surface of the plate and spaced from the peripheral surface of the plate by a distance greater than that necessary to permit thermal expansion and contraction of the mounting member and the plate and means for retaining each plate in its recess.

Thus, under the action of the braking couple, each graphite plate bears with its peripheral surface against the wall of its respective recess, that is to say, with a surface which is sufficiently large to transmit the braking force by a pressure sufficiently moderate to be compatible with the poor mechanical properties of the graphite, this arrangement causing the graphite to be worked exclusively in compression, in which mode the characteristics of the graphite are less weak.

The means for retaining each plate in its recess may comprise a countersunk rivet extending from the bottom of the recess and passing through the plate with a radial clearance greater than said spacing.

Alternatively, each graphite plate can be fixed in its recess by adhesion for example by gluing, by welding, by means of a pre-layer metallizing the graphite, or by an intermediate layer of a graphite having transition properties. The mounting members can be made of metal, for example steel, titanium, beryllium or alloys thereof, or of any material having suitable mechanical characteristics and density, including some varieties of graphite different from conventional graphite.

The graphite plates can be provided in recesses in the stator or the rotor of the brake, according to considerations of choice or convenience.

However, one of the important features of a brake is represented by the relation of the braking couple with respect to speed, or to the temperature of the parts of the brake which are liable to undergo a rise in temperature, or to time. According to the uses to which the brake is to be put, it is possible to seek to achieve constancy in the braking coupled for a given pressure, irrespective of the speed or temperature conditions, or it is possible to seek to achieve a relation between braking couple and speed or temperature.

For this purpose, U.S. Pat. No. 3,895,693 recommends using, in a heat sink brake, at least two kinds of friction pads, the qualities of which are different while being associated to achieve a given braking couple relation.

The stators can be provided with one kind of graphite pad and the rotors with another kind of graphite pad. It is also possible for the stators to be provided with two or more kinds of pads of different graphites and for the rotors to be provided with two or more kinds of pads of different graphites. Generally, it is also possible to associate, in the brake, friction pads made of graphite and friction pads made of another material such as, for example, steel, copper and alloys thereof.

SUMMARY OF THE INVENTION

It is among the objects of the present invention to achieve uniform braking couples for a selected pressure, independently of the temperature of the lining members, using disc brakes whose stators are provided with friction linings of a first particular kind of graphite and whose rotors are provided with friction linings of a second particular kind of graphite. Thus, it has been found that the use of lining members of the same kind of graphite both on the stators and on the rotors results in irregular braking couples, insofar as the braking couples achieved when the brake is cold are much inferior to the braking couples achieved when the brake is hot. In order to ensure the minimum braking couple required, in the cold operating state, it is therefore necessary to apply substantial pressures which, when the brake is hot, result in very high braking couples which can cause destruction of the discs or even the brake structures.

According to the present invention there is provided a disc brake comprising a rotor and a stator wherein the rotor and/or the stator includes a mounting member provided with a friction lining formed at least in part by a plurality of graphite plates, each plate having two flat side faces and a peripheral surface which is perpendicular to the two flat side faces, each plate being recieved in a recess in a side face of the mounting member, each recess having a flat bottom surface and being of a depth less than the thickness of the plate, the side wall of the recess being parallel to the peripheral surface of the plate and spaced from the peripheral surface of the plate by a distance greater than that necessary to permit thermal expansion and contraction of the mounting member and the plate and means for retaining each plate in its recess, wherein the graphite plates of one of the rotor and the stator are formed of polycrystalline graphite and the other of the rotor and the stator is formed of and/or has graphite plates formed of structural graphite.

By "polycrystalline graphite" is meant any graphite produced by hot compression, either of particles of graphite or of particles of carbon, which are then subjected to a more or less intensive graphitization operation.

By "structural graphite" is meant any graphite comprising a substantial proportion of threads or fabrics of carbon or graphite, said threads or fabrics being arranged in superposed layers which are connected together, either by gaseous diffusion (a proccess known under the name of "carbon vapor deposit" or CVD), or by successive impregnation of materials which are polymerized, then carbonized or graphitized. Such graphites are known in the United States of America as "carbon-carbon" materials.

Advantageously, the mounting member of that one of the rotor and stator having graphite plates of polycrystalline graphite is formed of steel, titanium, beryllium or alloys thereof, or of a structural graphite or of a complex substance containing same, the embedded fabrics contained in the structural graphite providing the appropriate mechanical characteristics.

In addition, in a preferred embodiment of the invention, the mounting member of that one of the rotor and stator which carries the structural graphite plates in itself made of structural graphite.

Advantageously, the means retaining each plate in its recess comprises a countersunk rivet extending from the bottom of the recess and passing through the plate with a radial clearance greater than said spacing.

A particularly simple and economical preferred form of manufacture has said polycrystalline graphite plates provided on the stator with a mounting member of steel while the rotor is a unitary element of structural graphite.

BRIEF DESCRIPTION OF THE DRAWING

The invention is diagrammatically illustrated by way of example in the accompanying drawings, in which:

FIG. 1 is a radial section through a disc brake according to the invention taken through the axis of rotation and through the axis of an operating piston/cylinder arrangement and a set of graphite plates;

FIG. 2 is an elevational view showing an angular sector of a rotor of the disc brake of FIG. 1; and FIG. 3 is a radial section taken on line III—III in FIG. 2.

DETAILED DESCRIPTION

Referring to FIG. 1, a disc brake comprises a frame 1 carrying piston/cylinder arrangements 2 for applying operating pressure. A heat sink comprises stators 3 and rotors 4, the stators being provided with plates 7 of polycrystalline graphite which can be brought into frictional engagement with the rotors which are in the form of unitary elements 13 of structural graphite. It is the polycrystalline graphite plates 7 and the unitary structural graphite elements 13 which in fact form the heat sink. The stators 3 of the brake are of the same structure as the stators of the disc brake of U.S. Pat. No. 3,895,693.

Thus, each stator is in the form of an annular disc comprising a variable number of sectors which bear one against the other, in per se known manner. Each sector comprises a steel frame member 6 and at least one polycrystalline graphite plate 7 which is housed in at least one recess provided for that purpose in the steel frame member. Each plate 7 has two flat side faces and a perpendicular peripheral surface, each recess having a flat bottom surface and being of a depth less than the thickness of the respective plate. The side wall of the recess is parallel to the peripheral surface of the plate and is spaced therefrom by a distance greater than that necessary to permit thermal expansion and contraction between the mounting member and the plate fixing means, for example, rivets 8, serve for fixing the polycrystaline graphite pltes 7 to the steel frame member 6. Upon assembly, these rivets 8 have a radial clearance which permits the polycrystalline graphite plate 7 to be displaced slightly in the recesses of the frame member 6. Specifically, the radial clearance is greater than the spacing between the peripheral surface of plate 7 and the side wall of the stator recess.

When braking is effected, such displacement of the plates permits the peripheral edges of the polycrystalline graphite plates 7 to come into abutment against the edge of the respective recess. This makes it possible to transmit the forces produced by the friction action, from the graphite plates 7 to their steel frame member 6, primarily in compression, in which mode the mechanical strength of the graphite is at its best. For this purpose, the crystalline graphite plates 7 are deeply engaged in the recesses of the steel frame member 6. In a preferred embodiment of the invention, the polycrystalline graphite used is characterized by its very high degree of purity and its high specific gravity, which in every case is higher than 1.8.

Referring to FIGS. 2 and 3, the rotor 4 is in the form of an annular ring 13 of structural graphite. This unitary ring acts both as the rotor structure and as the rotor friction lining members. As is conventional in disc brakes, on its outer diameter the rotor has notches 15 provided in the structural graphite block, so that the latter has the appearance of a notched ring. Rotational drive keys carried by the movable member to be braked are engaged in the notches.

This construction of the rotors and stators is given only by way of non-limiting example; the number and geometrical shape of the recesses in the stators can vary, and likewise the notches 15 can be provided on the internal diameter of the rotor. Likewise, also included within the scope of the invention is a brake comprising unitary stators of structural graphite, and rotors comprising frame members carrying polycrystalline graphite plates. In addition, as already stated above, the structure carrying the polycrystalline graphite plates can be made of structural graphite or any complex substance containing such a structural graphite.

What is claimed is:

1. A disc brake comprising a rotor element and a stator element, one of said elements including a mounting member provided with a friction lining formed at least in part by a plurality of graphite plates, each of said plates having two flat side faces and a peripheral surface which is perpendicular to said two flat side faces, each of said plates being received in a recess provided in a side face of said mounting member, each said recess having a flat bottom surface and being of a depth less than the thickness of said plate, the side wall of said recess being parallel to said peripheral surface of said plate and spaced from said peripheral surface of said plate by a distance greater than that necessary to permit thermal expansion and contraction between said mounting member and said plate means for retaining said plate in said recess, said graphite plates of one of said elements being formed of polycrystalline graphite, the other of said elements being formed as a unitary element of structural graphite.

2. A disc brake as claimed in claim 1, wherein the mounting member of said one element for said graphite plates of polycrystalline graphite is made from steel, titanium, beryllium, or alloys of steel, titanium and beryllium, or structural graphite or a complex substance containing structural graphite.

3. A disc brake as claimed in claim 1, wherein said means for retaining said plate in said recess comprises a countersunk rivet extending from the bottom of said recess and passing through said plate with a radial clearance greater than said spacing between the peripheral surface of the plate and the side wall of the recess.

4. A disc brake comprising a rotor element and a stator element, each of said elements including a respective mounting member provided with a friction lining formed at least in part by a plurality of graphite plates, each of said plates having two flat side faces, each of said plates being received in a recess provided in a side face of said mounting member, each said recess having a flat bottom surface and being of a depth less than the thickness of said plate, the side wall of said recess being parallel to said peripheral surface of said plate and spaced from said peripheral sruface of said plate by a distance greater than that necessary to permit thermal expansion and contraction between said mounting member and said plate and means for retaining said plate in said recess, said graphite plates of one of said elements being formed of polycrystalline graphite and said graphite plates of the other of said elements being formed of structural graphite.

5. A disc brake as claimed in claim 4, wherein the mounting member of said element having said graphite plates of polycrystalline graphite is formed of steel, titanium, beryllium, or alloys of steel, titanium and beryllium, or structural graphite or a complex substance containing structural graphite.

6. A disc brake as claimed in claim 4, wherein said means for retaining said plate in said recess comprises a countersunk rivet extending from the bottom of said recess and passing through said plate with a radial clearance greater than said spacing between the peripheral surface of the plate and the side wall of the recess.

7. A disc brake as claimed in claim 1, wherein said other element is composed of structural graphite in entirety.

8. A disc brake as claimed in claim 4, wherein said other element is composed of structural graphite in entirety.

* * * * *